(12) United States Patent
Schüttinger

(10) Patent No.: US 10,886,768 B2
(45) Date of Patent: Jan. 5, 2021

(54) SEEING AID DEVICE HAVING INDUCTIVE BATTERY CHARGING

(71) Applicant: A. SCHWEIZER GMBH OPTISCHE FABRIK, Forchheim (DE)

(72) Inventor: Alfred Schüttinger, Heroldsbach (DE)

(73) Assignee: A. SCHWEIZER GMBH OPTISCHE FABRIK, Forchheim (DE)

( * ) Notice: Subject to any disclaimer, the term of this patent is extended or adjusted under 35 U.S.C. 154(b) by 0 days.

(21) Appl. No.: 15/766,355

(22) PCT Filed: Sep. 12, 2016

(86) PCT No.: PCT/EP2016/071448
§ 371 (c)(1),
(2) Date: Apr. 5, 2018

(87) PCT Pub. No.: WO2017/063802
PCT Pub. Date: Apr. 20, 2017

(65) Prior Publication Data
US 2018/0301924 A1   Oct. 18, 2018

(30) Foreign Application Priority Data

Oct. 13, 2015  (DE) ................. 10 2015 117 403

(51) Int. Cl.
*G02B 27/02* (2006.01)
*H02J 7/02* (2016.01)
(Continued)

(52) U.S. Cl.
CPC .............. *H02J 7/025* (2013.01); *G02B 25/02* (2013.01); *H02J 7/0021* (2013.01); *H02J 50/10* (2016.02); *G02B 25/002* (2013.01)

(58) Field of Classification Search
CPC ....... G02B 25/02; G02B 25/002; H02J 7/025; H02J 50/10; H02J 7/0021
(Continued)

(56) References Cited

U.S. PATENT DOCUMENTS 9,143,033 B2     9/2015  Tai et al.
2014/0091758 A1*  4/2014  Hidaka .................. H01F 38/14
                                                    320/108
(Continued)

FOREIGN PATENT DOCUMENTS

CN       200965588 Y     10/2007
CN       203859549 U1    10/2014
(Continued)

OTHER PUBLICATIONS golem.de, "Wireless Power Consortium," https://www.golem.de/1007/76725.html, Jul. 26, 2010, URL: https://www.golem.de/print.php?a=76725, retrieved on Dec. 9, 2019.

*Primary Examiner* — William Choi
(74) *Attorney, Agent, or Firm* — Rimôn, P.C.

(57) ABSTRACT

The invention relates to a visual aid apparatus (1), in particular an optically or electronically magnifying visual aid apparatus (1), comprising at least one electrical or electronic functional component (2) that consumes electrical energy in at least one operating state, at least one rechargeable electrical energy store (3) that is assigned to the at least one electrical or electronic functional component (2), at least one inductive element (4) that is assigned to the at least one electrical energy store (3) and configured to supply the at least one electrical energy store (3) with electrical energy by way of an inductive interaction with at least one further inductive element (5).

16 Claims, 4 Drawing Sheets

(51) Int. Cl.
*G02B 25/02* (2006.01)
*H02J 50/10* (2016.01)
*H02J 7/00* (2006.01)
*G02B 25/00* (2006.01)

(58) Field of Classification Search
USPC .................................................. 359/802, 803
See application file for complete search history.

(56) References Cited

U.S. PATENT DOCUMENTS

2015/0281531 A1* 10/2015 Kato .................... H04N 5/2252
348/374
2015/0381781 A1* 12/2015 Feng ................... H04M 1/0208
455/566

FOREIGN PATENT DOCUMENTS

| | | |
|---|---|---|
| CN | 104696849 A | 6/2015 |
| DE | 202007019339 U1 | 1/2012 |
| DE | 102011051612 A1 | 1/2013 |
| DE | 202012012890 U1 | 2/2014 |
| DE | 102014009724 A1 | 12/2014 |
| GB | 2411009 A | 8/2005 |
| WO | 2010062479 A1 | 6/2010 |
| WO | 2011138089 A1 | 11/2011 |
| WO | 2014076048 A2 | 5/2014 |

\* cited by examiner

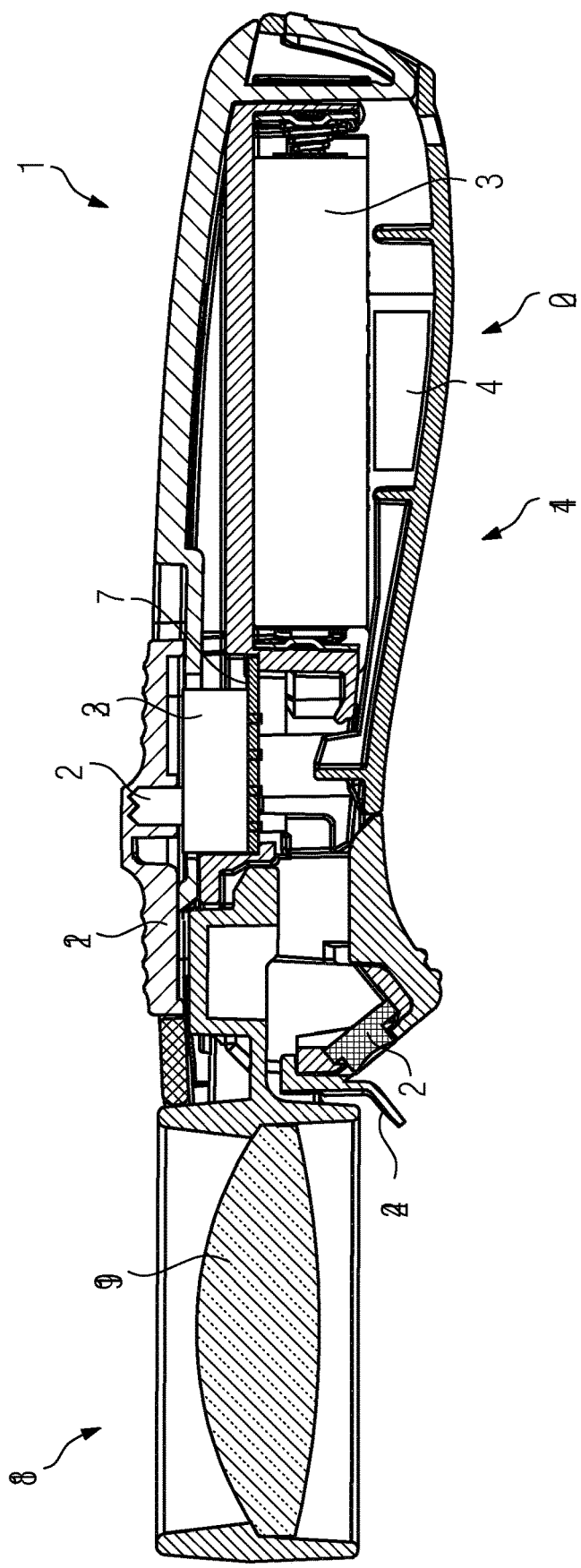

SEEING AID DEVICE HAVING INDUCTIVE BATTERY CHARGING

CROSS-REFERENCE TO RELATED APPLICATIONS

This application is a United States national stage entry of an International Application serial no. PCT/EP2016/071448 filed Sep. 12, 2016 which claims priority to German Patent Application serial no. 10 2015 117 403.0 filed Oct. 13, 2015. The contents of these applications are incorporated herein by reference in their entirety as if set forth verbatim.

DESCRIPTION

The invention relates to visual aid apparatus, in particular an optically or electronically magnifying visual aid apparatus.

Corresponding visual aid apparatuses are known per se, for example in the form of optical or electronic magnifiers. Corresponding visual aid apparatuses may comprise electrical or electronic functional components for expanding the functionality thereof, for instance by way of integrated illuminants.

Electrical supply of corresponding electrical or electronic functional components is effectuated by way of a rechargeable electrical energy store, for example in the form of an accumulator, which has to occasionally be charged, i.e. supplied with electrical energy. To this end, the visual aid apparatus should be connected to an external electrical energy source by way of a supply cable; this may be complicated under certain circumstances, particularly for visually impaired users.

Proceeding therefrom, there is a need for developing appropriate visual aid apparatuses in view of the ease-of-use when charging the rechargeable electrical energy store.

The invention is based on the object of specifying an improved visual aid apparatus in comparison therewith.

The object is achieved by a visual aid apparatus according to the claims. The dependent claims in this respect relate to special embodiments of the visual aid apparatus.

The visual aid apparatus described herein serves, in particular, as an optically or electronically magnifying visual aid. Accordingly, the magnification of objects to be observed, i.e. in particular articles, image-based and/or text-based information contents, etc., that can be realized by means of the visual aid apparatus can be effectuated (purely) optically or (purely) electronically. Accordingly, the visual aid apparatus can be embodied, for example, as a mobile or stationary optical or electronic magnifier, in particular optical or electronic handheld magnifier, optical or electronic stand magnifier or optical or electronic hands-free magnifier, or as an optical or electronic magnifying glass, etc.

Thus, the visual aid apparatus can be embodied for purely optical magnification, for example in the form of an optical magnifier, wherein it comprises at least one optical element, typically a lens or magnifying glass, or it can be embodied for purely electronic magnification, for example in the form of an electronic magnifier, wherein it comprises at least one indication or display element for presenting electronically magnified objects in addition to an electronic magnification device that is implemented in terms of software and/or hardware.

The visual aid apparatus comprises at least one electrical or electronic functional component (electrical load) that consumes electrical energy in at least one operating state. The functional component consumes electrical energy (electric current) in order to be put into operation or kept in operation. Different operating states of the functional component may differ in terms of the respectively consumed electrical energy.

In the case of an optically magnifying visual aid apparatus, i.e. in the case of an optical magnifier, for example, a corresponding functional component can be e.g. an illuminant, for example in the form of a light-emitting diode (LED), which, in at least one operating state, emits light with certain optical properties, i.e., in particular, a certain intensity and a certain wavelength. A corresponding illuminant improves the visual aid apparatus to the extent that the object to be magnified thereby can be illuminated by means of the illuminant and, in this respect, can be perceived better, particularly in the case of poor light conditions.

In the case of an electronically magnifying visual aid apparatus, i.e., for example, in the case of an electronic magnifier, a corresponding functional component can be e.g. an indication or display element for presenting electronically magnified objects.

Irrespective of the specific embodiment of the at least one functional component, it is assigned at least one rechargeable electrical energy store. The functional component is supplied or can be supplied with electrical energy by way of the rechargeable electrical energy store, which is referred to briefly as "energy store" below. Typically, the energy store is an accumulator or a battery or the energy store comprises at least one thereof.

What is essential for the visual aid apparatus described herein is that charging processes of the energy store can be effectuated in wireless fashion. Accordingly, the visual aid apparatus need not be connected to a supply cable within the scope of appropriate charging processes for the energy store, which significantly improves the handling thereof. As mentioned at the outset, connecting a visual aid apparatus to a corresponding supply cable may, under certain circumstances, be inconvenient, particularly for visually impaired users.

Wireless charging processes for the energy store are possible because the energy store can be inductively charged, i.e. inductively supplied with electrical energy. To this end, the visual aid apparatus comprises at least one inductive element assigned to the energy store, said inductive element typically being in the form of an inductive coil (receiver or secondary coil). The inductive element is configured to supply the energy store with electrical energy by way of inductive interaction with at least one further inductive element that is typically in the form of a further inductive coil (transmitter or primary coil). The further inductive element is not a constituent part of the visual aid apparatus but, as explained below, a constituent part of a separate charger apparatus for charging the energy store of the visual aid apparatus. An apparatus-side inductive element may be referred to as "first inductive element"; a charger-apparatus-side further inductive element may be referred to as "second inductive element".

Inductive interaction should be understood to mean a wireless inductive energy transfer. Here, a magnetic field, in particular an alternating magnetic field, is produced in the further inductive element that serves as a transmitter or primary coil, as a result of which a voltage, in particular an AC voltage, is induced in the (apparatus-side) inductive element that serves as receiver or secondary coil.

There is an electrically conductive connection between the inductive element and the energy store are assigned thereto, and so electrical energy produced in the (apparatus-side) inductive element in the case of inductive interaction with a further inductive element with the scope of the charging process of the energy store can be supplied to the energy store.

Inductive charging processes of the energy store are typically controlled by way of a control device. Accordingly, the visual aid apparatus can comprise a control device, optionally connected between the at least one (apparatus-side) inductive element and the at least one energy store, that is configured to control the charge state and/or the charging operation of the energy store and to ascertain at least one charge state and/or charging operation information item that describes the charge state and/or the charging operation of the energy store. A corresponding control device can be implemented in terms of software and/or hardware.

Furthermore, the visual aid apparatus can comprise an output device that is assigned to the control device, said output device being configured to output at least one charge state or charging operation information item that was ascertained by the control device to a user and/or to a user-side (mobile) terminal, i.e., for example, a cellular telephone, smartphone, laptop, tablet, a smartwatch, etc. In the case of a direct output of appropriate charge state and/or charging operation information items to a user, a corresponding output device is configured, in particular, to output appropriate charge state and/or charging operation information items in an acoustic and/or optical and/or haptic manner. Certain charging or charging operation states can accordingly be output by certain assignable or assigned acoustic and/or optical and/or haptic signals. To this end, the output device may be embodied as a loudspeaker device for outputting acoustic signals with a certain intensity (volume), frequency and rhythm and/or as an indication device, embodied as a light-emitting diode in the simplest case, for outputting optical signals with a certain graphical presentation, frequency and rhythm and/or as a vibration device for outputting haptic signals with a certain intensity, frequency and rhythm, or the output device may comprise at least one thereof. When outputting appropriate charge state and/or charging operation information items to a user-side (mobile) terminal, the output device is configured to transmit corresponding charge state and/or charging operation information items directly or indirectly, i.e. via a communications network, for example, to a user-side (mobile) terminal.

The geometric structural arrangement or embodiment of the energy store or of the inductive element assigned thereto should be chosen, as a matter of principle, depending on the respective specific geometric structural configuration of the visual aid apparatus.

A possible geometric structural configuration of the visual aid apparatus provides for a main body, in particular an elongate main body, having at least one mounting portion for mounting at least one optical element, in particular a lens or a magnifying glass, or an electronic element, in particular an indication or display element for displaying electronically magnified objects, and at least one handling portion for handling the main body.

The main body may have an integral or multipart embodiment. A main body with a multipart embodiment comprises a plurality of main body elements that are connectable to one another or connected to one another in the assembled state of the visual aid apparatus. The connection of the main body elements can be releasable such that access may be provided into an interior delimited by a main body, in which different constituent part of the visual aid apparatus, such as e.g. the energy store, are arranged or embodied, by releasing the connection of at least two main body elements. The mounting portion and handling portion may be present as corresponding main body elements; however, equally, the mounting portion and the handling portion may have a multipart embodiment such that a main body segment may also be a mounting portion segment or a handling portion segment.

Independently of the integral or multipart embodiment of the main body, the inductive element may be arranged or embodied at or in the main body in the region of the handling portion. The same applies to the energy store and/or the control device and/or the output device.

Expediently, the inductive element is arranged within the main body below a longitudinal (central) axis of the handling portion, in particular in the region of the inner side of an outer wall of the handling portion. The expediency of this arrangement of the inductive element consists of the inductive element, firstly, being arranged in a well-protected manner against external influences, i.e., for example, mechanical and/or climatic influences, and, secondly, being able to be brought as close as possible to a further inductive element within the scope of a charging process for the energy store, ensuring a high effectiveness of the inductive interaction and hence of the charging process.

The handling portion can have, at least in portions, an ergonomic, i.e. bulbous, geometric form, which further improves the handling of the visual aid apparatus. Accordingly, the cross section of the handling portion may be, at least in portions, circular or round, i.e. ellipsoid or oval.

As mentioned previously, a functional component can be an illuminant, for example a light-emitting diode (LED), which, in at least one operating state, emits light with certain optical properties, i.e., in particular, a certain intensity and a certain wavelength. Such an illuminant is expediently arranged in the region of the mounting portion, and so light emitted by the illuminant strikes on at least the object that is or can be observed through the optical element. In the case of an optical visual aid apparatus, a stop portion may be arranged or embodied between the illuminant and the mounting portion or the optical element mounted thereby, as mentioned e.g. a lens or a magnifying glass, said stop portion being configured to prevent light emitted by the illuminant directly striking the optical element.

The invention further relates to a charger apparatus for charging an energy store of a visual aid apparatus as described above. The charger apparatus comprises at least one inductive element, i.e. an inductive coil (transmitter or primary coil), that is configured to inductively interact with an inductive element (receiver or secondary coil) assigned to an energy store, to be charged, of the visual aid apparatus in order to supply or charge the energy store in wireless fashion with electrical energy by way of inductive interaction. Naturally, in principle, energy stores of a plurality of apparatuses can also be inductively charged or supplied with electrical energy by way of a corresponding charger apparatus. All embodiments in conjunction with the visual aid apparatus apply analogously to the charger apparatus, and vice versa.

The charger apparatus may have a housing body which has at least one bearing portion, in particular at least one flat bearing portion, for bearing the housing body on a base, in particular a flat base i.e., for example, on a furniture board, in particular a table top, which facilitates a secure setup of the charger apparatus on a base, and/or at least one receiving portion for receiving, at least in portions and at least during a charging process of the respectively assigned energy store, the visual aid apparatus, which facilitates a safe and compact mount of the visual aid apparatus at or in the housing body.

Accordingly, the receiving portion can have at least one receiving contour that has an inverted shape to the outer contour of a main body, in particular a handling portion of the main body, of the visual aid apparatus. The receiving contour can be embodied by, for example, a depression, in particular a trough-like depression, at or in the housing body, in which the apparatus-side main body is receivable.

The charger device can comprise a control device that is configured to control the charging operation of the energy store and ascertain a charging operation information item that describes the charging operation of the energy store.

In a manner analogous to the apparatus-side control device, an output device may also be assigned to the charger-apparatus-side control device, said output device being configured to output at least one charging operation information item, ascertained by the control device, to a user and/or to a user-side (mobile) terminal. The explanations made in conjunction with the apparatus-side output device apply analogously.

The invention further relates to a charging arrangement for charging an energy store of a visual aid apparatus as described above by means of a charger apparatus as described above. All explanations made in conjunction with the visual aid apparatus and the charger apparatus apply analogously to the arrangement.

Finally, the invention relates to a method for charging energy store of a visual aid apparatus as described above, in particular by means of a charger apparatus as described above. According to the invention, the energy store to be charged is supplied with electrical energy, and hence charged, within the scope of a charging process by way of an inductive interaction between the at least one apparatus-side inductive element and at least one charger-apparatus-side further inductive element. All of the explanations in conjunction with the visual aid apparatus, the charger apparatus and the arrangement apply analogously to the method.

The invention is explained in more detail in the following figures on the basis of exemplary embodiments. In the figures:

FIG. 1 shows a schematic diagram of a visual aid apparatus according to an exemplary embodiment;

FIGS. 2, 3 respectively show a schematic diagram of a charger apparatus according to an exemplary embodiment;

FIG. 6 shows a longitudinal section through the visual aid apparatus shown in FIG. 5.

FIG. 1 shows, in the form of an optical magnifier, an exemplary embodiment of a corresponding visual aid apparatus 1, which serves as an optically magnifying visual aid.

In principle, an exemplary embodiment of the visual aid apparatus 1, e.g. in the form of an electronic magnifier, could also be an electronically magnifying visual aid apparatus 1 which serves as an electronically magnifying visual aid. Accordingly, in principle, the magnification of objects to be observed, i.e., in particular, articles, image-based and/or text-based information contents, etc., realized by means of the visual aid apparatus 1, can in principle be effectuated (purely) optically or (purely) electronically.

The visual aid apparatus 1 comprises one or more electrical or electronic functional component(s) 2 (electrical loads) that consume electrical energy in at least one operating state. A corresponding functional component 2 consumes electrical energy (electric current) in order to be put into operation or kept in operation. Different operating states of the functional component 2 can differ in terms of the respectively consumed electrical energy.

Figure 1:
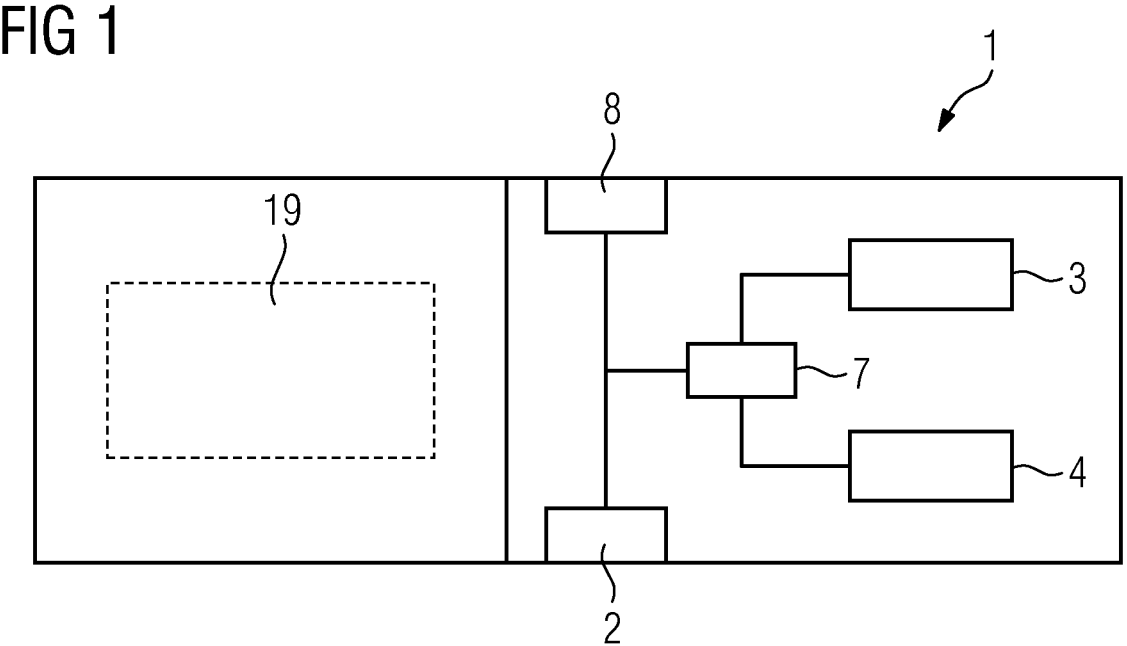
FIG. 1 shows a schematic diagram of a visual aid apparatus 1 according to an exemplary embodiment.

In the exemplary embodiment shown in FIG. 1, the functional component 2 is an illuminant, e.g. in the form of a light-emitting diode (LED), for emitting light, i.e. an illuminant which, in at least one operating state, emits light with certain optical properties, i.e., in particular, a certain intensity and a certain wavelength. In the case of an electronically magnifying visual aid apparatus 1, a corresponding functional component 2 could be an indication or display element, for example, for presenting electronically magnified objects.

Independently of the specific embodiment of the functional component 2, a rechargeable electrical energy store 3 is assigned thereto. The functional component 2 can be supplied or is supplied with electrical energy by way of the energy store 3. The energy store 3 is an accumulator or the energy store 3 comprises at least one such accumulator.

The visual aid apparatus 1 is configured in such a way that charging processes of the energy store 3 can be effectuated in wireless fashion. Accordingly, the visual aid apparatus 1 need not be connected to a supply cable within the scope of corresponding charging processes of the energy store 3, which significantly improves the handling of said visual aid apparatus.

Wireless charging processes of the energy store 3 are therefore possible because the energy store 3 can be inductively charged, i.e. inductively supplied with electrical energy. To this end, the visual aid apparatus 1 comprises an inductive element 4, assigned to the energy store 3, in the form of an inductive coil (receiver or secondary coil). The inductive element 4 is configured to supply the energy store 3 with electrical energy by way of an inductive interaction with a further inductive element 5 in the form of a further inductive coil (transmitter or primary coil). The further inductive element 5 is not a constituent part of the visual aid apparatus 1 but a constituent part of a separate charger apparatus 6, respectively shown in a schematic diagram in FIGS. 2, 3, for charging the energy store 3 of the visual aid apparatus 1. There is an electrically conductive connection between the inductive element 4 and the energy store 3, and so electrical energy produced in the (apparatus-side) inductive element 4 in the case of inductive interaction with a further inductive element 5 within the scope of a charging process of the energy store 3 can be supplied to the energy store 3.

Inductive interaction should be understood to mean a wireless inductive energy transfer. Here, a magnetic field, in particular an alternating magnetic field, is produced in the further inductive element 5 that serves as a transmitter or primary coil, as a result of which a voltage, in particular an AC voltage, is induced in the apparatus-side inductive element 4 that serves as receiver or secondary coil.

Inductive charging processes of the energy store 3 are controlled by way of an apparatus-side control device 7. The control device 7 that is connected between the inductive element 4 and the energy store 3 is configured to control the charge state and/or the charging operation of the energy store 3 and to ascertain at least one charge state and/or charging operation information item that describes the charge state and/or the charging operation of the energy store 3. The control device 7 can be implemented in terms of software and/or hardware.

An output device 8 can be assigned to the control device 7, said output device being configured to output a charge state or charging operation information item that was ascertained by the control device 7 to a user and/or to a user-side (mobile) terminal, i.e., for example, a cellular telephone, smartphone, laptop, tablet, a smartwatch, etc. In the case of a direct output of appropriate charge state and/or charging operation information items to a user, the output device 8 is configured, in particular, to output appropriate charge state and/or charging operation information items in an acoustic and/or optical and/or haptic manner. Certain charging or charging operation states can accordingly be output by certain assignable or assigned acoustic and/or optical and/or haptic signals. To this end, the output device 8 may be embodied as a loudspeaker device for outputting acoustic signals with a certain intensity (volume), frequency and rhythm and/or as an indication device 9 (see FIGS. 5, 6), embodied as a light-emitting diode in the simplest case, for outputting optical signals with a certain graphical presentation, frequency and rhythm and/or as a vibration device for outputting haptic signals with a certain intensity, frequency and rhythm, or the output device may comprise at least one thereof. When outputting appropriate charge state and/or charging operation information items to a user-side (mobile) terminal, the output device 8 is configured to transmit corresponding charge state and/or charging operation information items directly or indirectly, i.e. via a communications network, for example, to a user-side (mobile) terminal.

Figure 2:
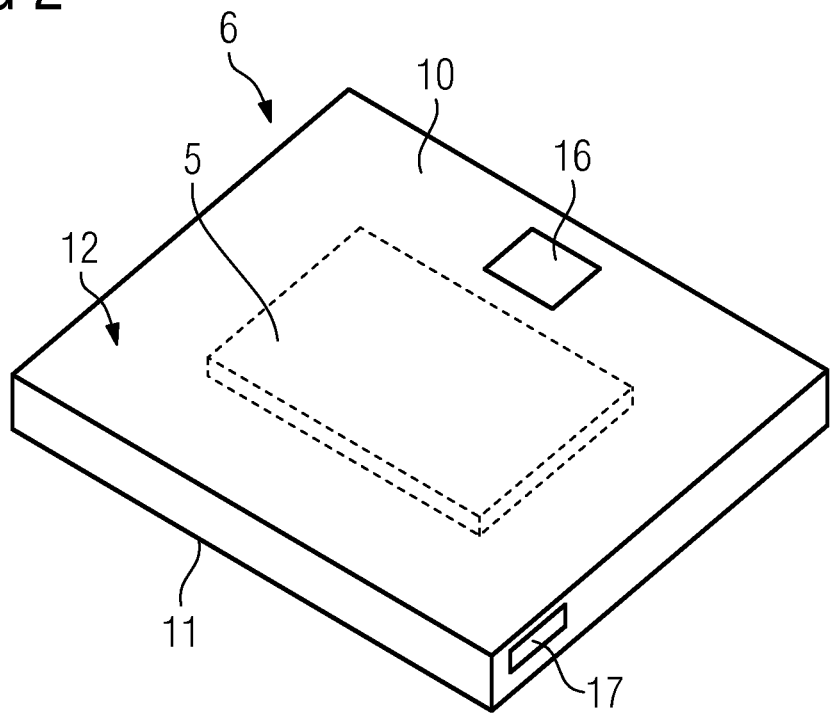

FIG. 2 shows a schematic diagram of a charger apparatus 6 for charging an energy store 3 of a visual aid apparatus 1 as shown in FIG. 1. The charger apparatus 6 comprises at least one inductive element 5, i.e. an inductive coil (transmitter or primary coil), which is configured to inductively interact with the inductive element 4 (receiver or secondary coil) assigned to the energy store 3, to be charged, of the visual aid apparatus 1 in order to supply or charge the energy store 3 in wireless fashion with electrical energy by way of an inductive interaction.

The charger apparatus 6 comprises a housing body 10. The main body 10 that is embodied in a plate-like or plate-shaped manner in FIG. 2 has a flat bearing portion 11 for bearing the housing body 10 on a base, in particular a flat base, i.e., for example, on a furniture board, in particular a table top. The bearing portion 11 is formed by the lower side of the housing body 10 that faces a respective base and facilitates a secure setup of the charger apparatus 6 on a base. The housing body 10 further has a receiving portion 12 for receiving at least portions of the visual aid apparatus 1, at least during a charging process of the energy store 3 assigned thereto. The receiving portion 12 is formed by the upper side of the housing body 10 that faces away from a respective base in the exemplary embodiment shown in FIG. 2 and it is consequently likewise flat.

Figure 3:
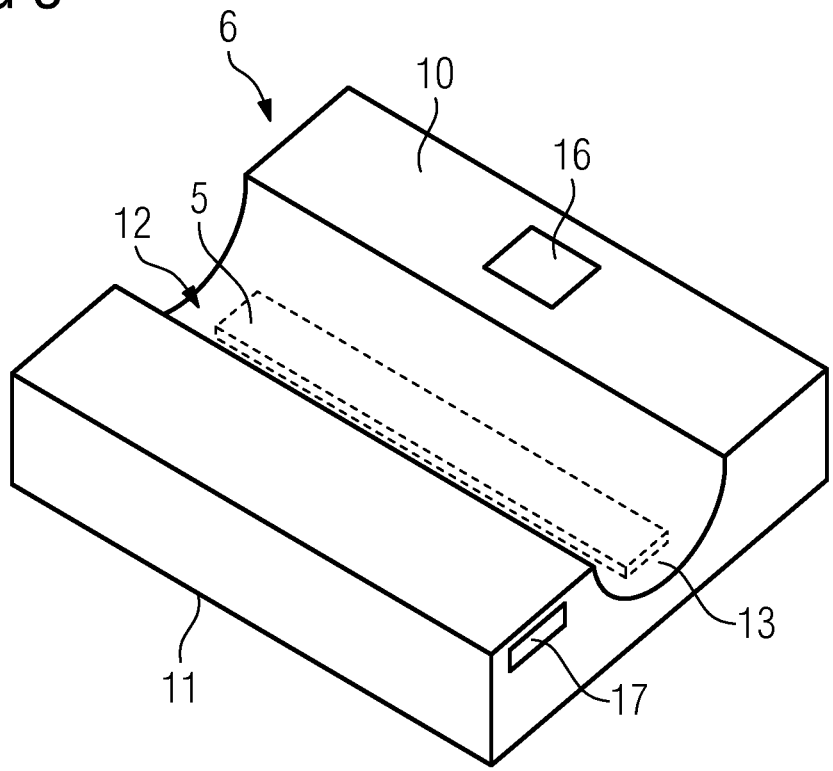

In the exemplary embodiment shown in FIG. 3, the bearing portion 11 is likewise formed by the lower side of the housing body 10 that faces a respective base—in a manner analogous to the exemplary embodiment shown in FIG. 2—and it facilitates a secure setup of the charger apparatus 6 on a base. By contrast, the receiving portion 12 is formed by a receiving contour 13 that has an inverted shape to the outer contour of a main body 14 of the visual aid apparatus 1, in particular of a handling portion 15 of the main body 14 of the visual aid apparatus 1 that is described in conjunction with the exemplary embodiments shown in FIGS. 5, 6, said receiving contour being in the form of a depression, in particular a trough-like depression, and said receiving portion 12 facilitates a particularly secure and compact mount of the visual aid apparatus 1 at or in the housing body 10.

The charger apparatus 6 can comprise a control device (not shown), which is configured to control the charging operation of the energy store 3 and to ascertain a charging operation information item that describes the charging operation of the energy store 3. In a manner analogous to the apparatus-side control device 7, an output device 16, for example in the form of an indication device, may be assigned to the charger-apparatus-side control device, too, said output device being configured to output, e.g. optically output, at least one charging operation information item, ascertained by the control device, to a user and/or to a user-side (mobile) terminal.

The charger apparatus 6 is equipped with an electrical connection element 16, for example in the form of a connector or plug-in socket, for connecting an electrical supply cable for connecting the charger apparatus 6 to an external electrical energy source (power source). The electrical connection element 16 is arranged or formed at an easily accessible exposed portion of the housing body 10.

Figure 4:
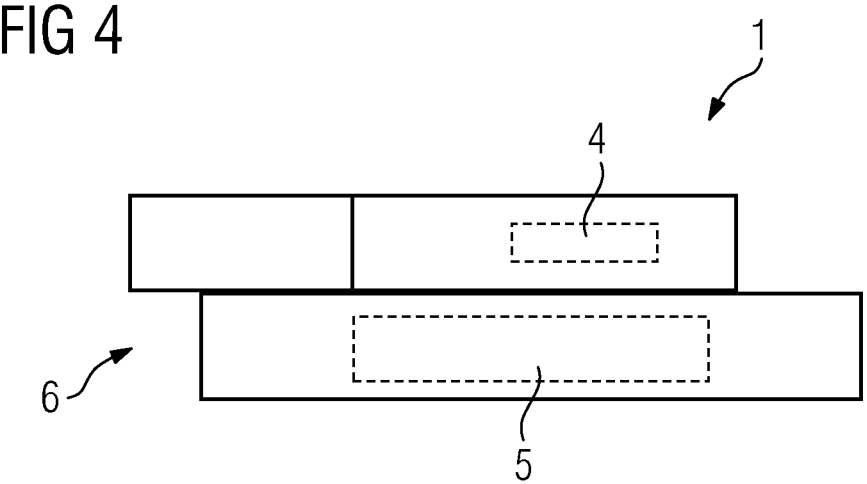
FIG. 4 shows a schematic diagram of a charging arrangement according to an exemplary embodiment.

FIG. 4 shows a schematic illustration of a charging arrangement for charging an energy store 3 of a visual aid apparatus 1, as shown in FIG. 1, by means of a charger apparatus 6, as shown in FIGS. 2, 3. Within the scope of the charging process, the visual aid apparatus 1 is arranged on the charger apparatus 6, i.e. placed onto the latter or placed into the latter, in such a way that an inductive interaction is possible between the apparatus-side inductive element 4 and the charger-apparatus-side inductive element 5.

Using the charging arrangement shown in FIG. 4, it is possible to carry out a method for charging an energy store 3 of a visual aid apparatus 1. According to the method, the energy store 3 to be charged is supplied with electrical energy, and hence charged, within the scope of a charging process by way of inductive interaction between the apparatus-side inductive element 4 and a further inductive element 5.

Figure 5:
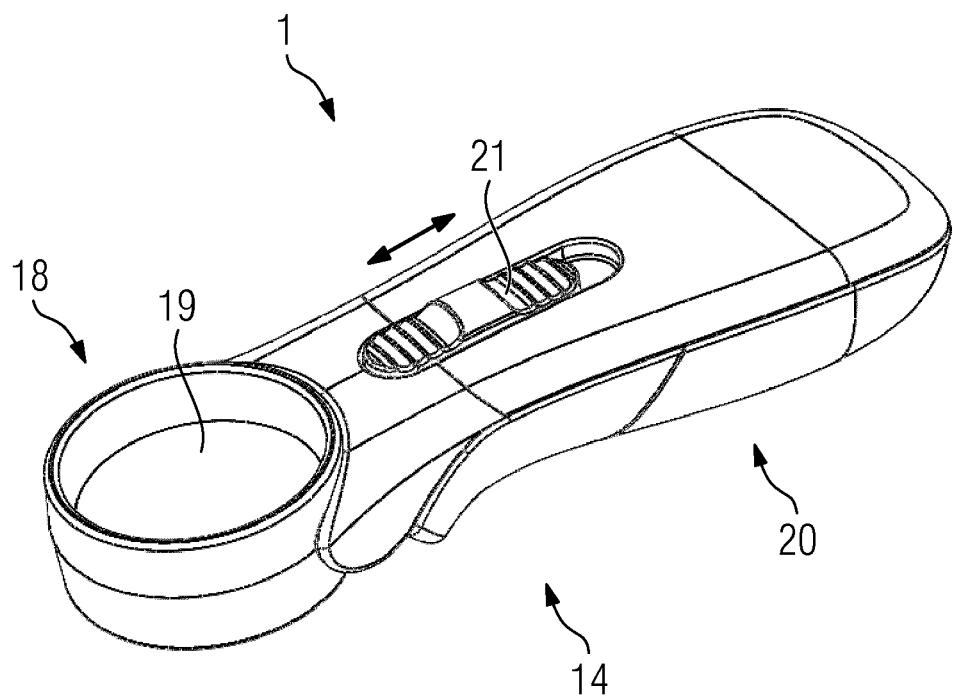
FIG. 5 shows a perspective illustration visual aid apparatus according to a further exemplary embodiment.

FIG. 5 shows a perspective illustration of a visual aid apparatus 1 according to a specific exemplary embodiment; FIG. 6 shows a longitudinal section through the visual aid apparatus 1 shown in FIG. 5. In principle, the explanations made in conjunction with the visual aid apparatus 1 shown in FIG. 1 in a schematic diagram apply analogously to the exemplary embodiment shown in FIGS. 5, 6 or the explanations made in conjunction with the visual aid apparatus 1 shown in FIG. 1 in a schematic diagram can be transferred to the exemplary embodiment shown in FIGS. 5, 6.

A main body 14, in particular an elongate main body, of the visual aid apparatus 1 can be seen on the basis of FIGS. 5, 6. The main body 14 is subdivided, at least functionally, into a mounting portion 18 for mounting an optical element 19, i.e. a lens or magnifying glass, and a handling portion 20 for handling the main body 14. The handling portion 20 has an ergonomic geometric form, i.e., for example, a bulbous geometric form, which further improves the handling of the visual aid apparatus 1.

It is clear from FIG. 6 that the inductive element 4 is arranged in the region of the handling portion 20 in the main body 14. The same applies to the energy store 3, the control device 7 and the functional component 2, which is an illuminant, i.e. a light-emitting diode (LED), that emits light with certain optical properties, i.e., in particular, a certain intensity and a certain wavelength, in at least one operating state.

The illuminant is arranged adjacent to the mounting portion 18 in the region of the handling portion 20 such that light emitted thereby strikes at least the object that can be or is observed through the optical element 19. A stop portion 24 is arranged or formed between the illuminant and the mounting portion 18, or the optical element 19 mounted thereby, said stop portion 24 being configured to prevent light emitted by the illuminant from directly striking the optical element 19.

The functional component 2 is associated with an actuation element 21 in the form of a slider that is mounted on the main body 14 such that it is movable relative thereto between two different positions, as indicated by the double-headed arrow in FIG. 5, said positions in each case being assigned certain operating states of the functional component 2. The actuation element 21 is movement-coupled to a likewise movably mounted transducer element 22 of a transducer device 23 that forms part of the control device 7, or in any case communicate therewith, by means of which transducer device corresponding positions of the actuation element 21 are converted into corresponding assigned operating states.

Specifically, the functional component 2 in the form of the illuminant may be deactivated e.g. in a first position such that the latter emits no light, it may be activated in a first operating state in a second position such that said illuminant emits light with certain optical properties, i.e. light with a first intensity and a first wavelength, and it may be activated in a second operating state in a third position such that said illuminant emits light with certain optical properties, i.e. light with a second intensity and/or a second wavelength.

On the basis of the longitudinal section shown in FIG. 6, it is clear that inductive element 4 is arranged below the energy store 3 and consequently below the longitudinal (central) axis of the handling portion 20, in particular in the region of the inner side of an outer wall of the handling portion 20, within the main body 14. This arrangement of the inductive element 4 is expedient since the inductive element 4, firstly, is arranged in a well-protected manner against external influences, i.e., for example, mechanical and/or climatic influences, and, secondly, can be brought as close as possible to a further inductive element 5, which does not form a constituent part of the visual aid apparatus 1, within the scope of a charging process for the energy store 3, ensuring a high effectiveness of the inductive interaction and hence of the charging process.

LIST OF REFERENCE SIGNS

1 Visual aid apparatus
2 Functional component
3 Energy store
4 Inductive element
5 Inductive element
6 Charger apparatus
7 Control device
8 Output device
9 Indication device
10 Housing body
11 Bearing portion
12 Receiving portion
13 Outer contour
14 Main body
15 Handling portion
16 Output device
17 Electrical connection element
18 Mounting portion
19 Optical element
20 Handling portion
21 Actuation element
22 Transducer element
23 Transducer device
24 Stop portion

The invention claimed is:

1. An optical magnifying visual aid apparatus (1) in the form of a mobile optical loupe or magnifying glass, comprising:
   at least one lens or magnifying glass,
   at least one electrical or electronic functional component (2) that consumes electrical energy in at least one operating state,
   at least one rechargeable electrical energy store (3) that is operably connected with the at least one electrical or electronic functional component (2),
   at least one inductive element (4) that is operably connected with the at least one electrical energy store (3) and configured to supply the at least one electrical energy store (3) with electrical energy by way of an inductive interaction with at least one further inductive element (5), and
   an elongate main body (14) with at least one mounting portion (18) for mounting the at least one lens or optical magnifying glass to at least one handling portion (20) for handling the main body (14), wherein the at least one inductive element (4) is arranged or embodied at or in the main body (14) in the region of the handling portion (20), wherein
   the at least one inductive element (4) is arranged within the main body (14) below a longitudinal central axis of the handling portion (20), in particular in the region of the inner side of an outer wall of the handling portion (20),
   wherein the at least one lens or magnifying glass is adapted to provide for direct viewing through the lens or magnifying glass by a user of the optical magnifying visual aid apparatus.

2. The optical magnifying visual aid apparatus according to claim 1, characterized in that the handling portion (20) has, at least in portions, an ergonomically formed, in particular bulbous, geometric form.

3. The optical magnifying visual aid apparatus according to claim 1, characterized by a control device (7) that is configured to control the charge state, in particular the charging operation, of the at least one electrical energy store (3) and to ascertain at least one charge state and/or charging operation information item that describes the charge state and/or the charging operation of the at least one electrical energy store (3).

4. The optical magnifying visual aid apparatus according to claim 3, characterized by at least one output device (8) that is assigned to the control device (7) and configured to output at least one charge state and/or charging operation information item, ascertained by the control device (7), to a user and/or to a user-side terminal.

5. The optical magnifying visual aid apparatus according to claim 1, characterized in that the electrical or electronic functional component (2), or at least one electrical or electronic functional component, is embodied as an illuminant, in particular as an LED, or at least comprises the latter.

6. The optical magnifying visual aid apparatus according to claim 5, characterized in that the illuminant is arranged in the region of the mounting portion (18) such that light emitted by the illuminant strikes at least the region observed through the optical element.

7. The optical magnifying visual aid apparatus according to claim 6, characterized in that a stop portion (24) is arranged or embodied between the optical element (19) and the functional component (2) embodied as an illuminant, said stop portion being configured to prevent light emitted by the illuminant directly striking the optical element (19).

8. The optical magnifying visual aid apparatus according to claim 1, characterized in that the at least one inductive element (4) is embodied as an inductive coil, in particular as an inductive receiver or secondary coil, or at least comprises the latter.

9. The optical magnifying visual aid apparatus according to claim 1, characterized in that it is embodied as a handheld magnifier or stand magnifier or a hands-free magnifier.

10. A charger apparatus (6) for charging a rechargeable electrical energy store (3) of the optical magnifying visual aid apparatus (1) according to claim 1, characterized by
at least one inductive element (5) that is configured to inductively interact with at least one inductive element (4) assigned to an electrical energy store (3), to be charged, of the visual aid apparatus (1) in order to supply the at least one electrical energy store (3) with electrical energy by way of inductive interaction.

11. The charger apparatus according to claim 10, characterized by a housing body (10) that has at least one receiving portion (13) for receiving, at least in portions and at least during a charging process of the respectively assigned electrical energy store (3), the visual aid apparatus (1) and/or has at least one bearing portion (11), in particular at least one flat bearing portion, for bearing the housing body (10) on a base, in particular a flat base.

12. The charger apparatus according to claim 11, characterized in that the receiving portion (13) has a receiving contour (13) that has an inverted shape to the outer contour of a main body (14), in particular a handling portion (20) of the main body (14), of the visual aid apparatus (1).

13. The charger apparatus according to claim 10, characterized by a control device that is configured to control the charging operation of the at least one electrical energy store (3) and ascertain at least one charging operation information item that describes the charging operation of the at least one electrical energy store.

14. The charger apparatus according to claim 13, characterized by at least one output device (16) that is assigned to the control device and configured to output at least one charging operation information item, ascertained by the control device, to a user and/or to a user-side terminal.

15. A charging arrangement for charging a rechargeable electrical energy store (3) of a visual aid apparatus (1) including a charger apparatus (6) according to claim 10.

16. Method for charging a rechargeable electrical energy store (3) of the optical magnifying visual aid apparatus (1) according to claim 1, characterized in that the at least one electrical energy store (3) is supplied with electrical energy within the scope of a charging process by way of an inductive interaction between the at least one apparatus-side inductive element (4) and at least one further inductive element (5).

* * * * *